(12) United States Patent
Ye et al.

(10) Patent No.: US 12,444,492 B2
(45) Date of Patent: Oct. 14, 2025

(54) MEDICAL IMAGE SEGMENTATION METHOD BASED ON BOOSTING-UNET SEGMENTATION NETWORK

(71) Applicant: SOUTH CHINA NORMAL UNIVERSITY, Guangdong (CN)

(72) Inventors: Qi Ye, Guangdong (CN); Lihui Wen, Guangdong (CN); Jiawei Chen, Guangdong (CN); Chihua Fang, Guangdong (CN)

(73) Assignee: SOUTH CHINA NORMAL UNIVERSITY, Guangdong (CN)

( * ) Notice: Subject to any disclaimer, the term of this patent is extended or adjusted under 35 U.S.C. 154(b) by 359 days.

(21) Appl. No.: 18/183,931

(22) Filed: Mar. 14, 2023

(65) Prior Publication Data

US 2023/0368896 A1 Nov. 16, 2023

(30) Foreign Application Priority Data

May 10, 2022 (CN) .......................... 202210502143.7

(51) Int. Cl.
  *G06T 7/10* (2017.01)
  *G06T 3/4007* (2024.01)
  *G16H 30/40* (2018.01)
(52) U.S. Cl.
  CPC ........... *G16H 30/40* (2018.01); *G06T 3/4007* (2013.01); *G06T 7/10* (2017.01); *G06T 2207/20084* (2013.01)
(58) Field of Classification Search
  None
  See application file for complete search history.

(56) References Cited

U.S. PATENT DOCUMENTS

2018/0218502 A1*  8/2018  Golden ..................... G06T 7/11
2019/0261945 A1*  8/2019  Funka-Lea ............ G06T 15/205
(Continued)

OTHER PUBLICATIONS

Han et al., ConvUNeXt: An efficient convolution neural network for medical image segmentation, Knowledge-Based Systems, vol. 253, 2022, 109512, pp. 1-17, DOI: 10.1016/j.knosys.2022.109512.*

(Continued)

*Primary Examiner* — Guillermo M Rivera-Martinez
(74) *Attorney, Agent, or Firm* — JCIPRNET

(57) ABSTRACT

The present invention provides a medical image segmentation method based on a Boosting-Unet segmentation network. By dividing training of an overall segmentation network into training of m sub segmentation networks, the method inherits convolution kernel parameters of the $(k-1)^{th}$ sub segmentation network during training of the $k^{th}$ sub segmentation network, thereby greatly decreasing the quantity of the convolution kernel parameters during every training and improving the learning ability of the network and the resistance to noise and image blur. In addition, a plurality of sub segmentation networks are arranged, so that the efficiency of the network is improved, a depth of an image data feature is also extracted, and the image data is segmented precisely, thereby improving the learning ability of the overall segmentation network to the image data feature, enhancing the robustness to noise disturbance information and further improving the performance of image segmentation.

1 Claim, 4 Drawing Sheets

Acquire a target medical image data set, pre-process the data set, and divide the data set into a training set and a validation set

↓

Construct single-layered segmentation networks according to a scale of the data set, and construct the overall segmentation network by utilizing the single-layered segmentation networks

↓

Divide the overall segmentation network into m sub segmentation networks, and training the m sub segmentation networks by utilizing the training set

↓

Input an original medical image of the validation set into the trained overall segmentation network, output image data results with labeled segmentation, and comparatively select an optimum overall segmentation network

(56) References Cited

U.S. PATENT DOCUMENTS

| | | | | |
|---|---|---|---|---|
| 2020/0167930 | A1* | 5/2020 | Wang | G06N 3/08 |
| 2021/0334955 | A1* | 10/2021 | Roth | G06T 7/0012 |
| 2021/0390664 | A1* | 12/2021 | Pohl | G06T 15/005 |
| 2022/0058466 | A1* | 2/2022 | Yang | G06N 3/08 |
| 2022/0279183 | A1* | 9/2022 | Besenbruch | G06T 3/4046 |
| 2022/0399101 | A1* | 12/2022 | Cai | G16H 50/20 |

OTHER PUBLICATIONS

Zhang et al., Dense-INception U-net for medical image segmentation, Computer Methods and Programs in Biomedicine, vol. 192, 2020, pp. 1-15, DOI: 0.1016/j.cmpb.2020.105395.*

Du et al., Medical Image Segmentation based on U-Net: A Review, Journal of Imaging Science and Technology, R 64(2), 2020, pp. 020508-1-020508-12, arXiv:2211.14830.*

Yang et al., An improved segmentation algorithm of CT image based on U-Net network and attention mechanism, Multimedia Tools and Applications, 2022, 81, pp. 35983-36006, DOI: 10.1007/s11042-021-10841-z.*

Dogan et al., A Two-Phase Approach using Mask R-CNN and 3D U-Net for High-Accuracy Automatic Segmentation of Pancreas in CT Imaging, Computer Methods and Programs in Biomedicine, vol. 207, 2021, pp. 1-16, DOI: 10.1016/j.cmpb.2021.106141.*

Huang et al., Semantic segmentation of pancreatic medical images by using convolutional neural network, Biomedical Signal Processing and Control, vol. 73, 2022, pp. 1-16, DOI: 10.1016/j.bspc.2021.103458.*

Yang et al., AX-Unet: A Deep Learning Framework for Image Segmentation to Assist Pancreatic Tumor Diagnosis, AX-Unet: A Deep Learning Framework for Image Segmentation to Assist Pancreatic Tumor Diagnosis, Front Oncol, Jun. 2, 2022, 2:894970, pp. 1-14, doi: 10.3389/fonc.2022.894970.*

Liu et al., A Review of Deep-Learning-Based Medical Image Segmentation Methods, Sustainability 2021, Jan. 2021, 13, 1224, pp. 1-29, doi.org/10.3390/su13031224.*

Yamashita et al., Convolutional neural networks: an overview and application in radiology, Insights into Imaging (2018) 9, Jun. 2018, pp. 611-629, doi.org/10.1007/s13244-018-0639-9.*

Etmann et al., iUNets: Fully invertible U-Nets with Learnable Upand Downsampling, Ver. 3, Jun. 2020, pp. 1-17, arXiv:2005.05220v3.*

Khattab et al., U-Net based Deep Convolutional Neural Network Models for Liver Segmentation from CT Scan Images, PHD Thesis, Sep. 2020, pp. 1-24, eprints.nottingham.ac.uk/65574/1/Mahmoud%20Khattab_Thesis_30092020_31052021.pdf.*

* cited by examiner

MEDICAL IMAGE SEGMENTATION METHOD BASED ON BOOSTING-UNET SEGMENTATION NETWORK

CROSS-REFERENCE TO RELATED APPLICATION

This application claims the priority benefit of China application serial no. 202210502143.7, filed on May 10, 2022. The entirety of the above-mentioned patent application is hereby incorporated by reference herein and made a part of this specification.

TECHNICAL FIELD

The present invention relates to the technical field of medical image segmentation, in particular to a medical image segmentation method based on a Boosting-Unet segmentation network.

BACKGROUND

Medical image segmentation plays a quite important role in clinical diagnosis and therapeutic processes. For example, in processes of determining a position of pancreatic cancer in a medical image of a patent, dividing a border position between pancreas and the pancreatic cancer and the like, it is necessary to realize precise identification and segmentation of related pancreas and pancreatic cancer. Doctors need to spend a lot of time and energy to view and analyze a lot of medical images, and information obtained by analyzing and judging CT and MRI with naked eyes is quite limited and uncertain. In medical imaging, related organs and tissues are likely to have the characteristics of obscure boundary, low contrast with peripheral tissues and organs, easily resulting in positioning difficulty. At present, CT image segmentation for pancreas and pancreatic cancer is carried out through existing disclosed CT image data of pancreas and pancreatic cancer. In the CT image of pancreas in real life, pancreas is a small stripe organ hidden behind peritoneum. The boundary of pancreas is obscure and is hardly found. Therefore, in a case where the disclosed data and a single neural network model are used, it is easily lead to inaccurate identification of the boundary of pancreatic cancer and low segmentation precision of pancreatic cancer.

In conventional medical image segmentation, segmentation is mainly completed by looking for an edge information feature of an image itself, and an originally set boundary approaches a real image boundary to realize segmentation. Deep learning, as an extension of a machine learning algorithm, also achieves a significant effect in medical image segmentation. Deep learning-based medical image segmentation mainly uses fully convolutional neural networks such as FCN, SegNet and Deeplab. A U-Net algorithm is often used in deep learning, which fuses low dimension with high dimension through skip connection, thereby achieving a better segmentation effect. Most current medical image segmentation algorithms are based on U-Net. However, due to problems of data imbalance in medical images, great difference among trained samples and the like, it is difficult to balance precision and a recall rate, feature extraction is insufficient, computing resources and model parameters are redundant, the segmentation effect is not obvious and the like. Therefore, more accurate segmentation of the medical images is still a problem to be urgently solved.

A training method for a medical image segmentation model, a medical image segmentation method and device is disclosed in the prior art. The method includes: acquiring a priori medical image, acquiring a priori medical image data set, and establishing a neutral network according to the priori medical image data set, so as to train a neutral network segmentation model. Based on this, segmentation of the medical images by means of the medical image segmentation model reduces the burden of medical work, thereby contributing to improving the efficiency of the medical work. However, the method of the invention using the conventional U-Net algorithm is not combined with a thought in AdaBoost. The process will reduce the learning ability of the network as a result of too many parameters because the entire network is trained uniformly, so that the precision can be further improved.

SUMMARY

The present invention provides a medical image segmentation method based on a Boosting-Unet segmentation network, which solves the problem of low resistance to noise and image blur as a result of too many training parameters.

In order to achieve the above-mentioned technical effect, the present invention adopts a technical solution as follows:

A medical image segmentation method based on a Boosting-Unet segmentation network includes the following steps:

S1: acquiring a target medical image data set, pre-processing the data set, and dividing the data set into a training set and a validation set;

S2: planning a number n of layers of an overall segmentation network according to a scale of the data set in S1, constructing single-layered segmentation networks, and constructing the overall segmentation network by utilizing the single-layered segmentation networks;

S3: dividing the overall segmentation network obtained in S2 into m sub segmentation networks, and training the m sub segmentation networks by utilizing the training set; and S4: inputting an original medical image of the validation set into the trained overall segmentation network obtained in S3, outputting image data results with labeled segmentation, and comparatively selecting an optimum overall segmentation network.

The method provided by the present invention divides the original medical image data set into the training set and the validation set, wherein the training set is configured to train the constructed overall segmentation network so as to obtain the optimum network parameters, and the validation set is configured to verify a result of the trained overall segmentation network. By dividing training of the overall segmentation network into training of m sub segmentation networks, the training parameters trained at a single time are reduced, and the learning ability and the resistance to noise and image blur of the network are improved. In addition, the plurality of sub segmentation networks are arranged to improve the accuracy of labeled segmentation of the original medical image.

Further, in S1, pre-processing the target medical image data set includes:

I: truncating and normalizing the medical image data, with a specific formula below:

$$V = \frac{\max(b, \min(a, V)) - a}{b - a}$$

wherein V is single medical image data in a target medical image data set, a is the minimum value in the single medical image data,
b is the maximum value in the single medical image data, and $\nabla$ is medical image data re-generated by truncating and normalizing the single medical image data; the target medical image data set comprises the original medical image and a medical image with labeled segmentation corresponding to the original medical image.

By truncating and normalizing the medical image data, reduction of the data numerical interval can be decreased, so that the medical image data is uniform in range and is more refined.

Further, in S2, the single-layered segmentation network is an $i^{th}$ layer of the overall segmentation network, wherein $1 \leq i \leq n$, the single-layered segmentation network comprises encoding blocks and decoding blocks, the encoding blocks perform feature data extraction on the inputted image data, the decoding blocks output the image data labeled with segmentation, the overall segmentation network is constructed by utilizing the single-layered segmentation networks, wherein the inputted image data is inputted to the encoding blocks of a $1^{st}$ layer, the encoding blocks of the $1^{st}$ layer to the $n^{th}$ layer are unidirectionally connected in series together successively in an output-input order to form an encoding path, outputs of the encoding blocks of the $n^{th}$ layer are unidirectionally connected to inputs of the decoding blocks of the $n^{th}$ layer, and the decoding blocks of the $n^{th}$ layer to the $1^{st}$ layer unidirectionally connected in series together successively in an output-input order to form a decoding path, and finally, the decoding blocks of the $1^{st}$ layer output the medical image data with labeled segmentation, and in addition, the encoding blocks in the same layer are to be in skip connection to the decoding blocks.

The processing flow for the image data of the overall segmentation network is as follows:
  inputting the image data to the encoding blocks of the $1^{st}$ layer to start encoding so as to generate a new feature image, then using the feature image data as the input of the encoding blocks of the $2^{nd}$ layer, and for each of the rest layers, continuously transferring the feature image data outputted by the layer into encoding blocks of the next layer (i.e., the feature image data outputted by the $(i-1)^{th}$ layer is used as the input of the encoding blocks of the $i^{th}$ layer, and here $2 \leq i \leq n$) till processing of the encoding blocks of the $n^{th}$ layer is completed, inputting the feature image data outputted by the encoding blocks of the $n^{th}$ layer into the decoding blocks in the same layer to be decoded, inputting the feature image data outputted by the decoding blocks in the same layer into the decoding blocks of the $(n-1)^{th}$ layer to be decoded, and for each of the rest layers, continuously transferring the feature image data outputted by the layer into the decoding blocks (i.e., the feature image data outputted by the $i^{th}$ layer is used as the input of the decoding blocks of the $(i-1)^{th}$ layer, and here $2 \leq i \leq n$) till processing of the encoding blocks of the $1^{st}$ layer is completed, and then outputting the final feature image data.

Image feature is obtained through the encoding blocks by a layer of the segmentation network (the Image feature obtained through by different layer varies). The deeper the layer of the encoding blocks is, the larger the depth of the image feature obtained, and the image feature needed to be highlighted has a larger field of view. An edge of an image feature graph with a larger size obtained through the encoding blocks layer by layer of the segmentation network is short of information. Some edge features will inevitably suffer from loss while the features are extracted by max pooling every time. The missing features cannot be retrieved from upsampling, so that retrieval of the edge features is realized by skip connection between the encoding blocks and the decoding blocks of the same layer.

Further, the constructing the encoding blocks of the layer by the $i^{th}$ layer, wherein $1 \leq i \leq n$, of the overall segmentation network includes the following steps:
  I: determining the number of needed convolution kernels, initializing the convolution kernels, and selecting an activation function and a pooling operation, specifically including the following operations:
  selecting two convolution kernels, wherein parameters of each convolution kernel of two convolution kernels are 3×3×3, i.e., three-dimensional matrix data with a height of 3, a width of 3 and a channel number of 3, and initializing the parameters of the convolution kernel in form of a random decimal matrix; setting the number of layers of the convolution kernel to be n×32, wherein n represents the $n^{th}$ layer of the overall segmentation network, setting a moving step length to be a pixel step length, and the moving step length uses zero-padding for invariable size of the outputted image data; and selecting a Relu function as the activation function and selecting max pooling with a kernel of 2×2 as the pooling operation;
  II: establishing a feature extraction flow for the inputted image data Convolution of the convolution kernel is a three-dimensional data matrix participating in operation. Corresponding positions are multiplied and then are added. The parameters of the convolution kernel are randomly initialized, and are continuously updated to optimum in a subsequent training process; the Relu function (which sets a number to be 0 if the number is less than 0, while keeping a number to be unchanged if the number is larger than 0) will set outputs of a part of image data to be 0 so as to form network sparsity, with simple calculation and improved efficiency. An interdependent relation between the parameters is reduced, occurrence of an overfitting problem is alleviated, and the actual rate of convergence is higher. The pooling operation can reduce the parameters and the amount of calculation while reserving main features of the image data, and also can alleviate occurrence of the overfitting problem.

Further, the feature extraction flow for the inputted image data in the step II specifically includes the following steps:
  ①performing a convolutional operation on the inputted image data of the $i^{th}$ layer and the convolution kernel to extract feature data;
  ②performing nonlinear function fitting activation on the extracted feature data by using the Relu function; and
  ③reducing the size of the feature data by means of max pooling after activation;
  the flow is repeated according to quantity of the convolution kernels.

Important features can be extracted after the image data is subjected to the processing process, and the segmentation network has a nonlinear smooth ability by means of the Relu function, so that the segmentation network has an autonomous learning ability. The max pooling operation can reduce the parameters and the amount of calculation while reserving main features of the image data, and also can alleviate occurrence of the overfitting problem.

Further, constructing the decoding blocks of the layer by the $1^{st}$ layer of the overall segmentation network includes the following steps:

I: determining the number of needed convolution kernels, initializing the convolution kernels, and selecting an upsampling method and an activation function, specifically including the following operations:

selecting four convolution kernels, wherein parameters of each of two convolution kernels of the four convolution kernels are 3×3×3, i.e., three-dimensional matrix data with a height of 3, a width of 3 and a channel number of 3, and initializing the parameters of the convolution kernels in form of a random decimal matrix; parameters of each of another two convolution kernels of the four convolution kernels are 1×1×1, i.e., has a height of 1, a width of 1 and a channel number of 1, and initializing the parameters of the convolution kernels in form of a random decimal matrix; setting the number of layers of each of the two 3×3×3 convolution kernels to be n×32, wherein n represents the $n^{th}$ layer of the overall segmentation network, setting the number of layers of each of the two 1×1×1 convolution kernels to be 2, setting a moving step length to be a pixel step length, and the moving step length uses zero-padding for invariable size of the outputted image data; and selecting trilinear interpolation as a method of upsampling, and selecting a Sigmoid function as the activation function;

II: establishing a processing flow for the inputted encoded feature data.

3×3×3 convolution kernel is configured to extract the image features, and 1×1×1 convolution kernel is configured to fully connect data channels of the outputted image features. The Sigmoid function, compared with the Relu function, is derivable in the whole course, with an expression interval of 0 to 1 or −1 to 1, and is usually used for a result output layer. Since the decoding blocks of the $1^{st}$ layer is a final segmentation result output of the overall segmentation network, the Sigmoid function is used; two many parameters will not be involved in upsampling by means of trilinear interpolation, so that the calculating complexity is reduced effectively; skip connection is in a splicing form in channel dimension of the feature data to realize feature fusion of the feature data with same resolution on the encoding blocks and the decoding blocks of the same layer, so as to compensating for position detail information lost in the feature extraction process.

Further, the processing flow for the inputted encoded feature data in the step II specifically includes the following steps:

①splicing the feature data with the feature data extracted by the encoding blocks in the same layer through skip connection to obtain the feature data of data that is two times of the number of original channels;

②performing a continuous convolutional operation on the inputted image data of the layer and the single 3×3×3 convolution kernel and the single 1×1×1 convolution kernel to extract new feature data;

③performing nonlinear function fitting activation on the extracted feature data by using a Sigmoid function; and ④upsampling the feature data by means of trilinear interpolation: doubling the three-dimensional data matrix of the feature extracted by the encoding blocks, calculating and completing edge data of a matrix first by means of monolinear interpolation, and then selecting any dimensional direction to calculate and complete data in the matrix by means of monolinear interpolation;

the flow is repeated according to the quantity of the same type convolution kernels.

The segmentation feature image data outputted by the decoding blocks of the $1^{st}$ layer of the overall segmentation network are a final output.

Further, the constructing the decoding blocks of the $i^{th}$ layer, wherein 1≤i≤n, of the overall segmentation network includes the following steps:

I: determining the number of needed convolution kernels, initializing the convolution kernels, and selecting an upsampling method and an activation function, specifically including the following operations:

selecting two convolution kernels, wherein parameters of each convolution kernel of two convolution kernels are 3×3×3, i.e., three-dimensional matrix data with a height of 3, a width of 3 and a channel number of 3, and initializing the parameters of the convolution kernel in form of a random decimal matrix; setting the number of layers of the convolution kernel to be n×32, wherein n represents the $n^{th}$ layer of the overall segmentation network, setting a moving step length to be a pixel step length, and the moving step length uses zero-padding for invariable size of the outputted image data; and selecting trilinear interpolation as a method of upsampling method, and selecting a Relu function as the activation function;

II: establishing a processing flow for the inputted encoded feature data.

Although the Sigmoid function is properly set in the result output layer, due to saturation at two ends thereof, information is easily abandoned in a propagation process. Therefore, the Relu function is selected as the activation function in the propagation process is in most cases. Compared with the Sigmoid function, the Relu function has a piecewise linear property, derivation of which is piecewise linear, so that it is more suitable for learning the optimized process. Further, the actual rate of convergence thereof is much faster than that of the Sigmoid function, so that it further satisfies a biological neural activation mechanism and is suitable for the segmentation network of the present invention. Finally, the Sigmoid function used for activation is an exponent arithmetic with large amount of calculation, and by using the Relu function, the amount of calculation can be reduced.

Further, the processing flow for the inputted encoded feature data the step SII specifically includes the following steps:

①splicing the feature data with the feature data extracted by the encoding blocks in the same layer through skip connection to obtain the feature data of data that is two times of the number of original channels;

②performing a convolutional operation on the inputted image data of the $i^{th}$ layer and the convolution kernel to extract new feature data;

③performing nonlinear function fitting activation on the extracted feature data by using the Relu function; and ④upsampling the feature data by means of trilinear interpolation: doubling the three-dimensional data matrix of the feature extracted by the encoding blocks, calculating edge data of a completion matrix first by means of monolinear interpolation, and then selecting any dimensional direction to calculate data in the completion matrix by means of monolinear interpolation.

The segmentation feature image data outputted by the decoding blocks of the $i^{th}$ layer of the overall segmentation network is an output of intermediate propagation.

In S3, the dividing the overall segmentation network into m sub segmentation networks specifically includes two ways: I, directly using the segmentation network of the $i^{th}$ layer as the $k^{th}$ sub segmentation network, wherein $1 \leq i \leq n$, $1 \leq k \leq m$; II, serially connecting and combining the segmentation networks of the $i^{th}$ layer to the $j^{th}$ layer as the $k^{th}$ sub segmentation network, wherein $1 \leq i \leq j \leq n$, $1 \leq k \leq m$; training the overall segmentation network includes: sequentially training the $1^{st}$ sub segmentation network was to the $m^{th}$ sub segmentation network, wherein since it is necessary to input the original image data to the encoding blocks of the $1^{st}$ layer according to a specific path for training the sub segmentation networks, the image data with labeled segmentation is outputted by the decoding blocks of the $1^{st}$ layer finally, and therefore, the $k^{th}$ sub segmentation network needs to combine the $1^{st}$ sub segmentation network to the $k^{th}$ sub segmentation network together to train, the way specifically including the following steps:

I: training the $(k-1)^{th}$ sub segmentation network;

II: fixing the parameters of the convolution kernels of the trained $(k-1)^{th}$ sub segmentation network; and III: training the $k^{th}$ sub segmentation network till training of all sub segmentation networks are trained completed;

wherein the training the $k^{th}$ sub segmentation network specifically includes:

with the parameters of the convolution kernels of the trained previous k−1 sub segmentation networks being fixed, inputting the original medical image data of the training set into the encoding blocks of the sub segmentation network of the $1^{st}$ layer to complete an encoding block-decoding block path of the sub segmentation network, and finally, outputting the image data with labeled segmentation by the decoding blocks of the sub segmentation network of the $1^{st}$ layer, calculating a loss function value according to an output result and the known image data with labeled segmentation, and optimizing the parameters of the convolution kernels of the $k^{th}$ sub segmentation network by means of a gradient back-propagation algorithm by utilizing a calculation result; and continuously iterating the above-mentioned process till a related result of the loss function is optimum, and using the parameters of the convolution kernels at the time as the optimum parameters of the convolution kernels of the $k^{th}$ sub segmentation network.

A user can, in terms of precision requirement, divide the overall segmentation network into several sub segmentation networks according to the single-layered segmentation network or a serial combination of a plurality of continuous single-layered segmentation networks, so that the precision on labeled segmentation of the original medical image is improved. In a case where the $k^{th}$ sub segmentation network is trained, the parameters of the convolution kernels of the $(k-1)^{th}$ sub segmentation network are inherited. Although it is necessary to input the original image data to the encoding blocks of the $1^{st}$ layer according to a specific path for training the sub segmentation networks, and finally, the image data with labeled segmentation are outputted by the $1^{st}$ layer through the previous (k−1)th sub segmentation networks, as the parameters of the convolution kernels of the previous (k−1)th sub segmentation networks are fixed, it is actually necessary to train the parameters of the convolution kernels of the $k^{th}$ sub segmentation network, such that the quantity of the convolution kernel parameters is reduced during every training, the efficiency of the network is improved, and the feature depth of the image data is further extracted. The image data is segmented precisely, thereby improving the learning ability of the overall segmentation network to the image data feature, enhancing the robustness to noise disturbance information and further improving the performance of image segmentation.

DETAILED DESCRIPTION OF EMBODIMENTS

Figure 1:
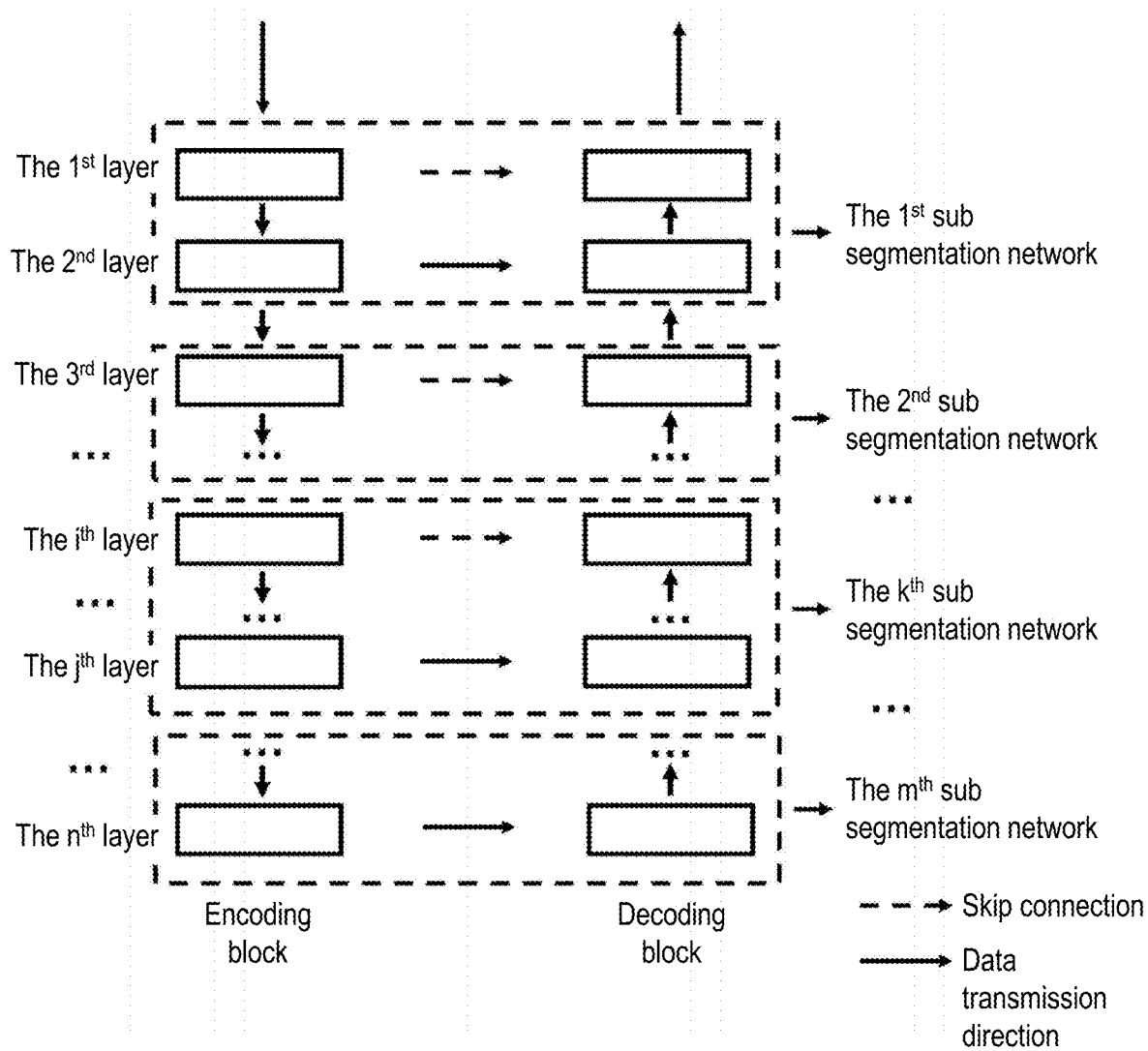
FIG. 1 is a structural diagram of an overall segmentation network in a medical image segmentation method based on a Boosting-Unet segmentation network.
Figure 2:
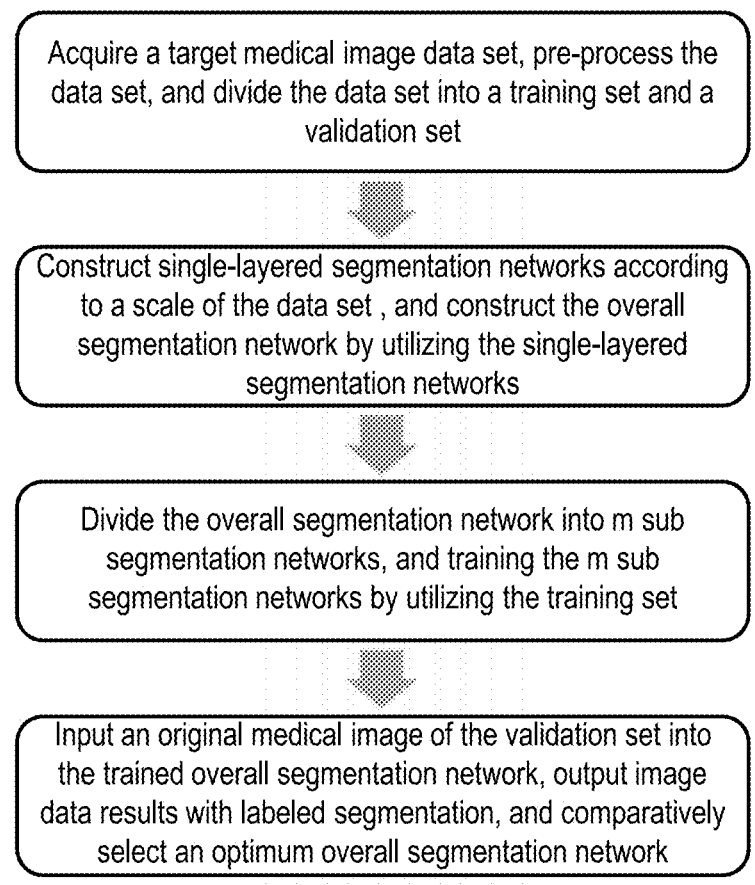
FIG. 2 is a flowchart of a medical image segmentation method based on a Boosting-Unet segmentation network.

The drawings are merely used for exemplary description and are not construed as limitation to the patent.

For those skilled in the art, it can be understood that some known descriptions in the drawings may be omitted.

The technical solution of the present invention will be further described below in combination with the drawings and the embodiments.

Embodiment 1

Figure 3:
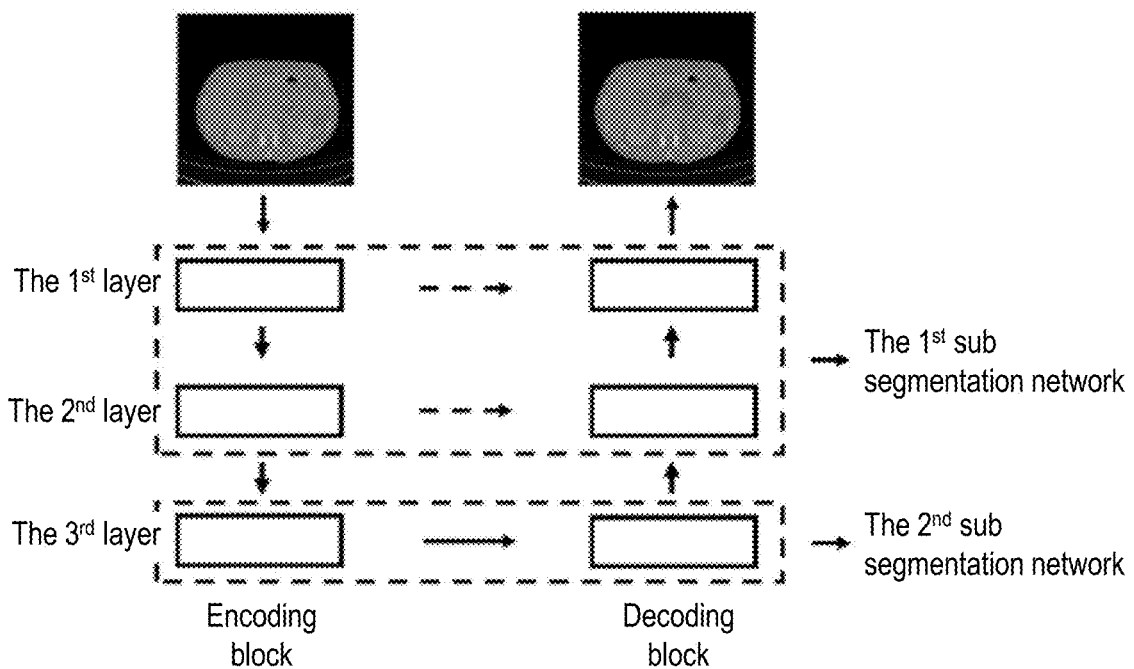
FIG. 3 is a structural diagram of an overall segmentation network involving 3 layers of single-layered segmentation networks, a $1^{st}$ sub segmentation network with the 2 layers and a $2^{nd}$ sub segmentation network with 1 layer.

A data set used in the present embodiment is from a pancreatic cancer-related CT slice image data set provided by a certain hospital, wherein the CT slice image data set includes CT slice image data in an arterial phase and a portal venous phase, which totally include CT slice images of 69 cases and amount to 27184 CT slice images totally, and totally occupy 48 GB space. The embodiment realizes segmentation of pancreas and pancreatic cancer thereof in the CT slice images by utilizing three layers of the constructed overall segmentation network, wherein n=3, i=1,2, 3, as shown in FIG. 3. The method in the present embodiment specifically includes the following steps:

S1: the CT slice image data set was acquired, and the CT slice image data set was truncated and normalized: it was assumed that there is a certain pixel value x in the original image data, and the pixel value x was truncated to be max(b, min(a)) according to a gray scale interval [a, b] of the CT slice image data, then the pixel value was subjected to normalizing processing to be $$\frac{\max(b, \min(a, x)) - a}{b - a},$$

all CT slice image data were subjected to the same operation, the processed CT slice image data were taken as an input, and further, a copy of CT slice image data was further backed up as the CT slice image data with labeled segmentation; and the CT slice image data set with labeled segmentation corresponding to the CT slice image data was divided into a training set and a validation set.

S2: the overall segmentation network including 3 layers of single-layered segmentation networks was constructed. The overall segmentation network includes an encoding path and a decoding path, the encoding path includes three layers of encoding blocks, a structure of the encoding path for feature data extraction is [(R_32, Relu,P),(R_64,Relu,P),(R_128,Relu,P)], wherein [R_32 represents that two convolutions, each with a kernel size of 3×3×3, a step length of 1 and the number of layers of 32, Relu represents an imported Relu activation function, P represents a max pooling operation with a kernel size of 2×2]; [R_64 represents two convolutions, each with a kernel size of 3×3×3, a step length of 1 and the number of layers of 64, Relu represents an imported Relu activation function, P represents a max pooling operation with a kernel size of 2×2]; [R_128 represents two convolutions, each with a kernel size of 3×3×3, a step length of 1 and the number of layers of 128, Relu represents an imported Relu activation function, P represents a max pooling operation with a kernel size of 2×2]. The CT slice image data-related feature data was extracted layer by layer; the decoding path includes three layers of decoding blocks, and a structure of the decoding path is [(Con, $R_{128}$, Relu, T), (Con, $R_{64}$, Relu, T), (Con, $R_{32}$, $R_2$, Sigmoid)].

[Con represents the feature data from the same dimension of the same layer of the encoding path and is used for skip connection; $R_{128}$ represents two convolutions, each with a kernel size of 3×3×3, a step length of 1 and the number of layers of 128; Relu represents an imported Relu activation function; T represents an upsampling operation by means of trilinear interpolation]; [Con represents the feature data from the same dimension of the same layer of the encoding path and is used for skip connection; $R_{64}$ represents two convolutions, each with a kernel size of 3×3×3, a step length of 1 and the number of layers of 64; Relu represents an imported Relu activation function; T represents an upsampling operation by means of trilinear interpolation]; [Con represents the feature data from the same dimension of the same layer of the encoding path; $R_{32}$ represents two convolutions, each with a kernel size of 3×3×3, a step length of 1 and the number of layers of 32; $R_2$ represents two convolutions, each with a kernel size of 1×1×1, a step length of 1 and the number of layers of 2; Sigmoid represents an imported Sigmoid activation function]. The feature data obtained by the encoding path was decoded to obtain a segmentation mask graph.

S3: the previous two layers of the overall segmentation network were taken as the $1^{st}$ sub segmentation network, and the last layer was taken as the $2^{nd}$ sub segmentation network; the CT slice image data of the training set was inputted into the overall segmentation network, the $1^{st}$ sub segmentation network was trained, the feature data was extracted through three layers of encoding paths of the $1^{st}$ sub segmentation network, and then the segmentation mask graph was outputted via the three layers of encoding paths; by utilizing the CT slice image data with labeled segmentation of the training set, a loss value $L(y_i, T_i)$ and a Dice coefficient Dice $(Y_i, T_i)$ of the $1^{st}$ sub segmentation network were calculated by utilizing a Dice loss function, with following calculation formulas:

$$L(Y_i, T_i) = 1 - \text{Dice}(Y_i, T_i)$$

$$\text{Dice}(Y_i, T_i) = \frac{2\|Y_i \cap T_i\|}{\|Y_i\| + \|T_i\|}$$

According to the loss value $L(y_i, T_i)$ the parameters of the segmentation network were updated by means of a gradient back-propagation algorithm and the training was regarded as being completed till the Dice coefficient Dice($Y_i$, $T_i$) of the $1^{st}$ sub segmentation network reached a stable numerical value, the parameters of the convolution kernels of the $1^{st}$ sub segmentation network were fixed, the $2^{nd}$ sub segmentation network was continued to be trained, the segmentation mask graph was generated through integral output, the loss value $L(Y_i, T_i)$ of the overall segmentation network was calculated by utilizing the same CT slice image data with labeled segmentation, the parameters of the $2^{nd}$ sub segmentation network were updated by means of the gradient back-propagation algorithm and the training was regarded as being completed till the Dice coefficient Dice($Y_i$, $T_i$) of the overall segmentation network reaches a stable numerical value.

S4: the CT slice image data of the validation set was inputted into the trained overall segmentation network, the segmentation mask graph was outputted and was compared with the CT slice image data with labeled segmentation of the validation set for validation, and the above process might be repeated many times to select the optimum 3-layered overall segmentation network.

Embodiment 2

Figure 4:
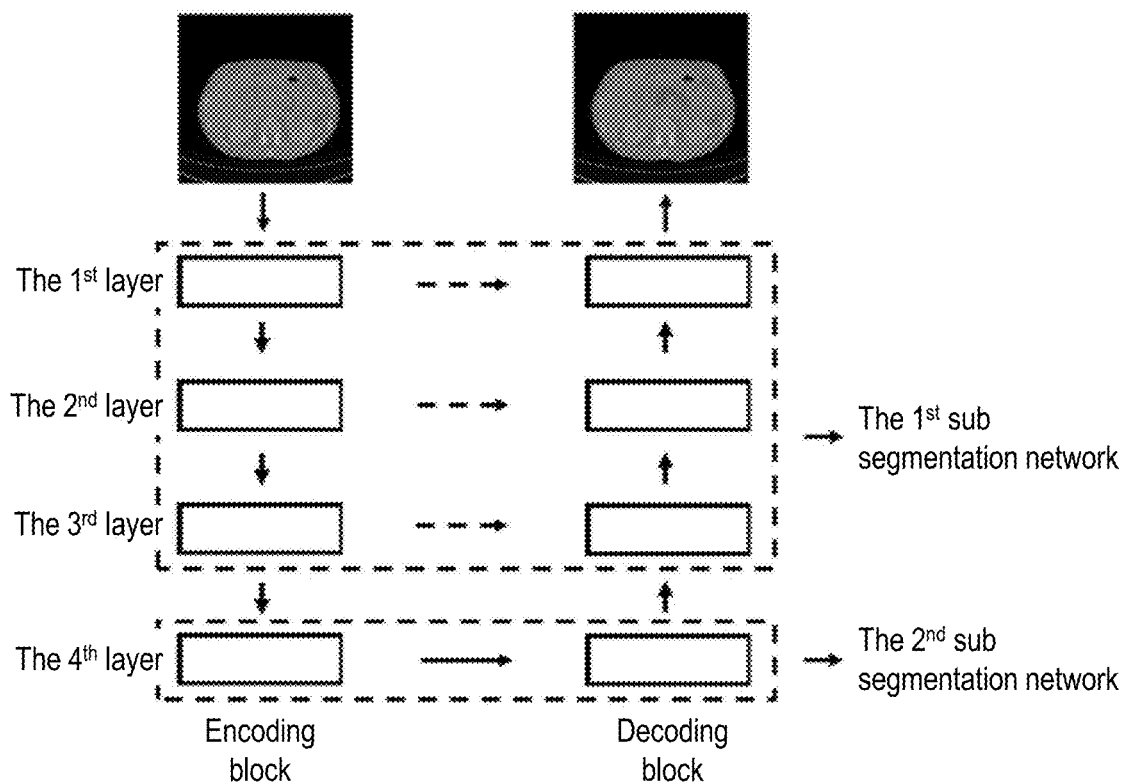
FIG. 4 is a structural diagram of an overall segmentation network involving 4 layers of single-layered segmentation networks, a $1^{st}$ sub segmentation network with 3 layers and a $2^{nd}$ sub segmentation network with 1 layer.

A data set used in the present embodiment is the same as that in the embodiment 1. The embodiment realizes segmentation of pancreas and pancreatic cancer thereof in the CT slice images by utilizing four layers of the constructed overall segmentation network, wherein n=4, i=1,2,3,4, as shown in FIG. 4. The method in the present embodiment specifically includes the following steps:

S1: the CT slice image data set was acquired, and the CT slice image data set was truncated and normalized: it was assumed that there was a certain pixel value x in the original image data, and the pixel value x was truncated to be max(b, min(a)) according to a gray scale interval [a, b] of the CT slice image data, then the pixel value was subjected to normalizing processing to be $$\frac{\max(b, \min(a, x)) - a}{b - a},$$

all CT slice image data were subjected to the same operation, the processed CT slice image data were taken as an input, and further, a copy of CT slice image data was further backed up as the CT slice image data with labeled segmentation; and the CT slice image data set with labeled segmentation corresponding to the CT slice image data was divided into a training set and a validation set.

S2: the overall segmentation network including 4 layers of single-layered segmentation networks was constructed. The overall segmentation network includes an encoding path and a decoding path, the encoding path includes four layers of encoding blocks, a structure of the encoding path for feature data extraction is [(R_32, Relu,P),(R_64, Relu,P),(R_128,Relu,P),(R_256,Relu, P)], wherein [R_32 represents that two convolutions, each with a kernel size of 3×3×3, a step length of 1 and the number of layers of 32, Relu represents an imported Relu activation function, P represents a max pooling operation with a kernel size of 2×2]; [R_64 represents two convolutions, each with a kernel size of 3×3×3, a step length of 1 and the number of layers of 64, Relu represents an imported Relu activation function, P represents a max pooling operation with a kernel size of 2×2]; [R_128 represents two convolutions with a kernel size of 3×3×3, a step length of 1 and the number of layers of 128, Relu represents an imported Relu activation function, P represents a max pooling operation with a kernel size of 2×2]; [R_256 represents two convolutions, each with a kernel size of 3×3×3, a step length of 1 and the number of layers of 256, Relu represents an imported Relu activation function, P represents a max pooling operation with a kernel size of 2×2]. The CT slice image data-related feature data was extracted layer by layer; the decoding path includes four layers of decoding blocks, and a structure of the decoding path is: [(Con, $R_{256}$, Relu, T), (Con, $R_{128}$, Relu, T), (Con, $R_{64}$, Relu, T), (Con, $R_{32}$, $R_2$, Sigmoid)]

[Con represents the feature data from the same dimension of the same layer of the encoding path and is used for skip connection; $R_{256}$ represents two convolutions, each with a kernel size of 3×3×3, a step length of 1 and the number of layers of 256; Relu represents an imported Relu activation function; T represents an upsampling operation by means of trilinear interpolation]; [Con represents the feature data from the same dimension of the same layer of the encoding path and is used for skip connection; $R_{128}$ represents two convolutions, each with a kernel size of 3×3×3, a step length of 1 and the number of layers of 128; Relu represents an imported Relu activation function; T represents an upsampling operation formula by means of trilinear interpolation]; [Con represents the feature data from the same dimension of the same layer of the encoding path and is used for skip connection; $R_{64}$ represents two convolutions, each with a kernel size of 3×3×3, a step length of 1 and the number of layers of 64; Relu represents an imported Relu activation function; T represents an upsampling operation by means of trilinear interpolation]; [Con represents the feature data from the same dimension of the same layer of the encoding path; $R_{32}$ represents two convolutions, each with a kernel size of 3×3×3, a step length of 1 and the number of layers of 32; $R_2$ represents two convolutions, each with a kernel size of 1×1×1, a step length of 1 and the number of layers of 2; Sigmoid represents an imported Sigmoid activation function].

The feature data obtained by the encoding path was decoded to obtain a segmentation mask graph.

S3: the previous three layers of the overall segmentation network were taken as the $1^{st}$ sub segmentation network, and the last layer was taken as the $2^{nd}$ sub segmentation network; the CT slice image data of the training set was inputted into the overall segmentation network, the $1^{st}$ sub segmentation network was trained, the feature data was extracted through three layers of encoding paths of the $1^{st}$ sub segmentation network, and then the segmentation mask graph was outputted via the three layers of encoding paths; by utilizing the CT slice image data with labeled segmentation of the training set, a loss value $L(y_i, T_i$ and a Dice coefficient Dice($Y_i$, $T_i$) of the $1^{st}$ sub segmentation network were calculated by utilizing a Dice loss function, with the following calculation formulas:

$$L(Y_i, T_i) = 1 - \text{Dice}(Y_i, T_i)$$

$$\text{Dice}(Y_i, T_i) = \frac{2\|Y_i \cap T_i\|}{\|Y_i\| + \|T_i\|}$$

According to the loss value $L(y_i, T_i)$, the parameters of the segmentation network were updated by means of a gradient back-propagation algorithm and the training was regarded as being completed till the Dice coefficient Dice($Y_i$, $T_i$) of the $1^{st}$ sub segmentation network reached a stable numerical value, the parameters of the convolution kernels of the $1^{st}$ sub segmentation network were fixed, the $2^{nd}$ sub segmentation network was continued to be trained, the segmentation mask graph was generated through integral output, the loss value $L(Y_i, T_i)$ of the overall segmentation network was calculated by utilizing the same CT slice image data with labeled segmentation, the parameters of the $2^{nd}$ sub segmentation network were updated by means of the gradient back-propagation algorithm and the training was regarded as being completed till the Dice coefficient Dice($Y_i$, $T_i$) of the overall segmentation network reaches a stable numerical value.

S4: the CT slice image data of the validation set was inputted into the trained overall segmentation network, the segmentation mask graph was outputted and was compared with the CT slice image data with labeled segmentation of the validation set for validation, and the above process might be repeated many times to select the optimum 4-layered overall segmentation network.

Embodiment 3

Figure 5:
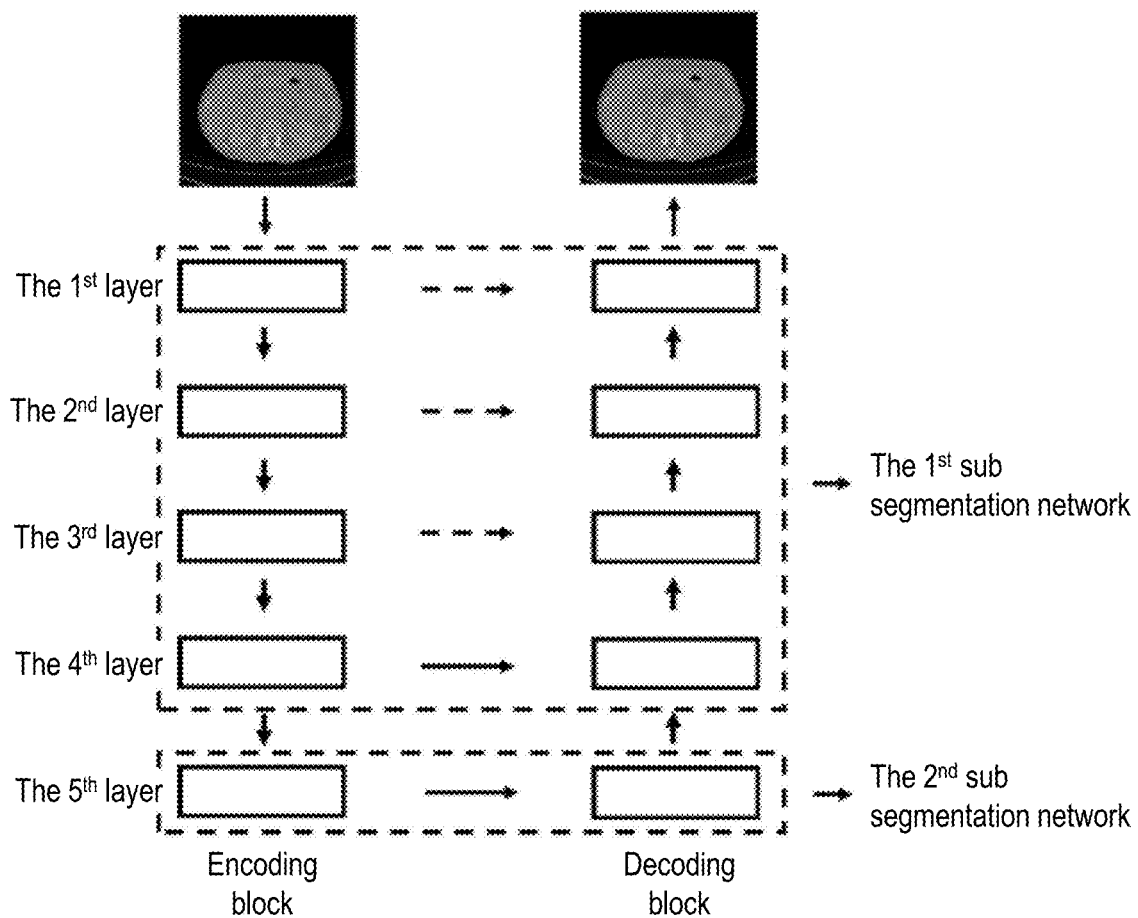
FIG. 5 is a structural diagram of an overall segmentation network involving 5 layers of single-layered segmentation networks, a $1^{st}$ sub segmentation network with 4 layers and a $2^{nd}$ sub segmentation network with 1 layer.

A data set used in the present embodiment is the same as that in the embodiment 1. The embodiment realizes segmentation of pancreas and pancreatic cancer thereof in the CT slice images by utilizing five layers of the constructed overall segmentation network, n=5, i=1,2,3,4,5 as shown in FIG. 5. The method in the present embodiment specifically includes the following steps:

S1: the CT slice image data set was acquired, and the CT slice image data set was truncated and normalized: it was assumed that there was a certain pixel value x in the original image data, and the pixel value x was truncated to be max(b, min(a)) according to a gray scale interval [a, b] of the CT slice image data, then the pixel value was subjected to normalizing processing to be $$\frac{\max(b, \min(a, x)) - a}{b - a},$$

all CT slice image data were subjected to the same operation, the processed CT slice image data were taken as an input, and further, a copy of CT slice image data was further backed up as the CT slice image data with labeled segmentation; and the CT slice image data set with labeled segmentation corresponding to the CT slice image data was divided into a training set and a validation set.

S2: the overall segmentation network including 5 layers of single-layered segmentation networks was constructed. The overall segmentation network includes an encoding path and a decoding path, the encoding path includes five layers of encoding blocks, a structure of the encoding path for feature data extraction is [(R_32, Relu,P),(R_64,Relu,P), (R_128,Relu,P),(R_256,Relu, P),(R_512,Relu,P)], wherein [R_32 represents that two convolutions, each with a kernel size of 3×3×3, a step length of 1 and the number of layers of 32, Relu represents an imported Relu activation function, P represents a max pooling operation with a kernel size of 2×2]; [R_64 represents two convolutions, each with a kernel size of 3×3×3, a step length of 1 and the number of layers of 64, Relu represents an imported Relu activation function, P represents a max pooling operation with a kernel size of 2×2]; [R_128 represents two convolutions, each with a kernel size of 3×3×3, a step length of 1 and the number of layers of 128, Relu represents an imported Relu activation function, P represents a max pooling operation with a kernel size of 2×2]; [R_256 represents two convolutions with a kernel size of 3×3×3, a step length of 1 and the number of layers of 256, Relu represents an imported Relu activation function, P represents a max pooling operation with a kernel size of 2×2]. [R_512 represents two convolutions, each with a kernel size of 3×3×3, a step length of 1 and the number of layers of 512, Relu represents an imported Relu activation function, P represents a max pooling operation with a kernel size of 2×2]. The CT slice image data-related feature data was extracted layer by layer; the decoding path includes five layers of decoding blocks, and a structure of the decoding path, (Con, $R_{256}$, Relu, T), (Con, $R_{128}$, Relu, T), (Con, $R_{64}$, Relu, T), (Con, $R_{32}$, $R_2$, Sigmoid) [Con represents the feature data from the same dimension of the same layer of the encoding path and is used for skip connection; $R_{512}$ represents two convolutions, each with a kernel size of 3×3×3, a step length of 1 and the number of layers of 512; Relu represents an imported Relu activation function; T represents an upsampling operation by means of trilinear interpolation]; [Con represents the feature data from the same dimension of the same layer of the encoding path and is used for skip connection; $R_{256}$ represents two convolutions, each with a kernel size of 3×3×3, a step length of 1 and the number of layers of 256; Relu represents an imported Relu activation function; T represents an upsampling operation formula by means of trilinear interpolation]; [Con represents the feature data from the same dimension of the same layer of the encoding path and is used for skip connection; $R_{128}$ represents two convolutions, each with a kernel size of 3×3×3, a step length of 1 and the number of layers of 128; Relu represents an imported Relu activation function; T represents an upsampling operation by means of trilinear interpolation]; [Con represents the feature data from the same dimension of the same layer of the encoding path and is used for skip connection; $R_{64}$ represents two convolutions, each with a kernel size of 3×3×3, a step length of 1 and the number of layers of 64; Relu represents an imported Relu activation function; T represents an upsampling operation by means of trilinear interpolation]; [Con represents the feature data from the same dimension of the same layer of the encoding path; $R_{32}$ represents two convolutions, each with a kernel size of 3×3×3, a step length of 1 and the number of layers of 32; $R_2$ represents two convolutions, each with a kernel size of 1×1×1, a step length of 1 and the number of layers of 2; Sigmoid represents an imported Sigmoid activation function].

The feature data obtained by the encoding path was decoded to obtain a segmentation mask graph.

S3: the previous four layers of the overall segmentation network were taken as the $1^{st}$ sub segmentation network, and the last layer was taken as the $2^{nd}$ sub segmentation network; the CT slice image data of the training set was inputted into the overall segmentation network, the $1^{st}$ sub segmentation network was trained, the feature data was extracted through three layers of encoding paths of the $1^{st}$ sub segmentation network, and then the segmentation mask graph was outputted via the three layers of encoding paths; by utilizing the CT slice image data with labeled segmentation of the training set, a loss value $L(y_i, T_i)$ and a Dice coefficient $Dice(Y_i, T_i)$ of the $1^{st}$ sub segmentation network were calculated by utilizing a Dice loss function, with the following calculation formulas:

$$L(Y_i, T_i) = 1 - \text{Dice}(Y_i, T_i)$$
$$\text{Dice}(Y_i, T_i) = \frac{2\|Y_i \cap T_i\|}{\|Y_i\| + \|T_i\|}$$

According to the loss value $L(y_i, T_i)$, the parameters of the segmentation network were updated by means of a gradient back-propagation algorithm and the training was regarded as being completed till the Dice coefficient $Dice(Y_i, T_i)$ of the $1^{st}$ sub segmentation network reached a stable numerical value, the parameters of the convolution kernels of the $1^{st}$ sub segmentation network were fixed, the $2^{nd}$ sub segmentation network was continued to be trained, the segmentation mask graph was generated through integral output, the loss value $L(Y_i, T_i)$ of the overall segmentation network was calculated by utilizing the same CT slice image data with labeled segmentation, the parameters of the $2^{nd}$ sub segmentation network were updated by means of the gradient back-propagation algorithm and the training was regarded as being completed till the Dice coefficient $Dice(Y_i, T_i)$ of the overall segmentation network reaches a stable numerical value.

S4: the CT slice image data of the validation set was inputted into the trained overall segmentation network, the segmentation mask graph was outputted and was compared with the CT slice image data with labeled segmentation of the validation set for validation, and the above process might be repeated many times to select the optimum 5-layered overall segmentation network.

Compared with the finally trained Dice coefficient Dice $(Y_i, T_i)$ of the overall segmentation networks in embodiments 1, 2 and 3, the optimum overall segmentation network is the four-layered overall segmentation network, wherein the previous three layers are taken as the $1^{st}$ sub segmentation network, and the last layer is taken as the $2^{nd}$ sub segmentation network.

Compared with the prior art, the present invention has the following beneficial effects:

the present invention provides a medical image segmentation method based on a Boosting-Unet segmentation network. By dividing training of an overall segmentation network into training of m sub segmentation networks, the method inherits convolution kernel parameters of the $(k-1)^{th}$ sub segmentation network during training of the $k^{th}$ sub segmentation network, thereby greatly decreasing the quantity of the convolution kernel parameters during every training and improving the learning ability of the network and the resistance to noise and image blur. In addition, a plurality of sub segmentation networks are arranged, so that the efficiency of the network is improved, a depth of an image data feature is also extracted, and the image data is segmented precisely, thereby improving the learning ability of the overall segmentation network to the image data feature, enhancing the robustness to noise disturbance information and further improving the performance of image segmentation.

Apparently, the embodiments of the present invention are merely examples made for describing the present invention clearly and are not to limit the embodiments of the present invention. Changes or variations in other different forms can be further made by those of ordinary skill in the art on a basis of the description. It is unnecessary to and unable to list all the embodiments herein. Any modification, equivalent replacement, improvement, etc. made within the spirit and principle of the present invention shall be regarded as within the protection scope of the claims of the present invention.

What is claimed is:

1. A medical image segmentation method based on a Boosting-Unet segmentation network, comprising following steps:
    S1: acquiring a pancreas cancer-related CT slice image data set, pre-processing the data set, and dividing the data set into a training set and a validation set, wherein the data set includes original medical images and corresponding known medical images with labeled segmentation;
    S2: planning a number n of layers of an overall segmentation network according to a scale of the data set in S1, constructing single-layered segmentation networks, and constructing the overall segmentation network by utilizing the single-layered segmentation networks, wherein the overall segmentation network is an instance of the Boosting-Unet segmentation network;
    S3: dividing the overall segmentation network obtained in S2 into m sub segmentation networks, where m is an integer greater than or equal to 1, and training the m sub segmentation networks by utilizing the training set; and
    S4: inputting an original medical image of the validation set into the trained overall segmentation network obtained in S3, outputting image data results with labeled segmentation, and comparatively selecting an optimum of the trained overall segmentation network based on the image data results;
    in the S1, the pre-processing the data set comprises:
    I: truncating and normalizing each of medical image data in the data set, with a specific formula below:

$$\overline{V} = \frac{\max(b, \min(a, V)) - a}{b - a}$$

wherein V is single medical image data in the data set, a is a minimum value in the single medical image data, b is a maximum value in the single medical image data, and $\overline{V}$ is medical image data re-generated by truncating and normalizing the single medical image data; the data set comprises the original medical image and a medical image with labeled segmentation corresponding the original medical image;
    in the S2, each of the single-layered segmentation networks is an $i^{th}$ layer of the overall segmentation network, wherein 1≤i≤n, each of the single-layered segmentation networks comprises encoding blocks and decoding blocks, the encoding blocks perform feature data extraction on data inputted in the encoding blocks, the decoding blocks output image data labeled with segmentation, the overall segmentation network is constructed by utilizing the single-layered segmentation networks, the inputted image data is inputted to encoding blocks of a $1^{st}$ layer, the encoding blocks of the $1^{st}$ layer to an $n^{th}$ layer are unidirectionally connected in series together successively in an output-input order to form an encoding path, outputs of encoding blocks of the $n^{th}$ layer are unidirectionally connected to inputs of the decoding blocks of the $n^{th}$ layer, and the decoding blocks of the $n^{th}$ layer to the $1^{st}$ layer unidirectionally connected in series together successively in an output-input order to form a decoding path, and finally, the decoding blocks of the $1^{st}$ layer output the medical image data with labeled segmentation, and in addition, the encoding blocks in same layer are to be in skip connection to the decoding blocks;
    the constructing encoding blocks of the $i^{th}$ layer, wherein 1≤i≤n, of the overall segmentation network comprises following steps:
    I: determining a number of needed convolution kernels, initializing the convolution kernels, and selecting an activation function and a pooling operation, specifically comprising following operations:
    selecting two convolution kernels, wherein parameters of each convolution kernel of the two convolution kernels are 3×3×3, i.e., three-dimensional matrix data with a height of 3, a width of 3 and a channel number of 3, and initializing the parameters of the convolution kernel in form of a random decimal matrix; setting the number of layers of the convolution kernel to be n×32, wherein n represents an $n^{th}$ layer of the overall segmentation network, setting a moving step length to be a pixel step length, and the moving step length uses zero-padding for invariable size of the outputted image data; and selecting a rectified linear unit (Relu) function as the activation function and selecting max pooling with a kernel of 2×2 as the pooling operation;
    II: establishing a feature extraction flow for the inputted image data;
    the feature extraction flow for the inputted image data in the step II specifically comprises following steps:
    ① Performing a convolutional operation on the inputted image data of the $i^{th}$ layer and the convolution kernel to extract feature data;
    ② Performing nonlinear function fitting activation on the extracted feature data by using the Relu function; and
    ③ Reducing a size of the feature data by means of max pooling after activation;
    repeating the feature extraction flow according to quantity of the encoding layers;
    constructing the decoding blocks of the $1^{st}$ layer of the overall segmentation network comprises following steps:
    I: determining the number of needed convolution kernels, initializing the convolution kernels, and selecting an upsampling method and an activation function, specifically comprising following operations:
    selecting four convolution kernels, wherein parameters of each of two convolution kernels of four convolution kernels are 3×3×3, i.e., three-dimensional matrix data with a height of 3, a width of 3 and a channel number of 3, and initializing the parameters of the convolution kernels in form of a random decimal matrix; parameters of each of another two convolution kernels of four convolution kernels are 1×1×1, i.e., three-dimensional matrix data with a height of 1, a width of 1 and a channel number of 1, and initializing the parameters of the convolution kernels in form of a random decimal matrix; setting the number of layers of each of the two 3×3×3 convolution kernels to be n×32, wherein n represents the $n^{th}$ layer of the overall segmentation network, setting the number of layers of each of the two 1×1×1 convolution kernels to be 2, setting a moving step length to be a pixel step length, and the moving step length uses zero-padding for invariable size of the outputted image data; and selecting trilinear interpolation as a method of the upsampling, and selecting a Sigmoid function as the activation function;

II: establishing a processing flow for the inputted encoded feature data;

the processing flow for the inputted encoded feature data in the step II specifically comprises following steps:

①  Splicing the feature data with the feature data extracted by the encoding blocks in the same layer through skip connection to obtain the feature data of data that is two times of a number of original channels;

② Performing a continuous convolutional operation on the inputted image data of the $1^{st}$ layer and the 3×3×3 convolution kernel and the 1×1×1 convolution kernel to extract new feature data;

③ Performing nonlinear function fitting activation on the extracted feature data by using a Sigmoid function; and ④ Upsampling the feature data by means of trilinear interpolation: doubling a three-dimensional data matrix of the feature extracted by the encoding blocks, calculating and completing edge data of a matrix first by means of monolinear interpolation, and then selecting any dimensional direction to calculate and complete data in the matrix by means of monolinear interpolation;

repeating the processing flow according to a quantity of convolution kernels of a same type as step I of constructing the decoding blocks of the $1^{st}$ layer;

constructing the decoding blocks of the $i^{th}$ layer, wherein 1<i≤n, of the overall segmentation network comprises following steps:

I: determining the number of needed convolution kernels, initializing the convolution kernels, and selecting an upsampling method and an activation function, specifically comprising following operations:

selecting two convolution kernels, wherein parameters of each convolution kernel are 3×3×3, i.e., three-dimensional matrix data with a height of 3, a width of 3 and a channel number of 3, and initializing the parameter of the convolution kernel in form of a random decimal matrix; setting the number of layers of the convolution kernel to be n×32, wherein n represents the $n^{th}$ layer of the overall segmentation network, setting a moving step length to be a pixel step length, and the moving step length uses zero-padding for invariable size of the outputted image data; and selecting trilinear interpolation as a method of upsampling, and selecting a Relu function as the activation function;

II: establishing a processing flow for the inputted encoded feature data;

the processing flow for the inputted encoded feature data in the step II specifically comprises the following steps:

① Splicing the feature data with the feature data extracted by the encoding blocks in the same layer through skip connection to obtain the feature data of data that is two times of a number of original channels;

② Performing a convolutional operation on the inputted image data of the $i^{th}$ layer and the convolution kernel to extract new feature data;

③ Performing nonlinear function fitting activation on the extracted feature data by using the Relu function; and ④ Upsampling the feature data by means of trilinear interpolation: doubling the three-dimensional data matrix of the feature extracted by the encoding blocks, calculating and completing edge data of a matrix first by means of monolinear interpolation, and then selecting any dimensional direction to calculate and complete data in the matrix by means of monolinear interpolation;

In the S3, dividing the overall segmentation network into m sub segmentation networks specifically comprises two ways: I, directly using the single-layered segmentation network of an $i^{th}$ layer as a $k^{th}$ sub segmentation network, wherein i is layer index and i is an integer, wherein k is an integer index for the sub segmentation networks, and wherein 1≤i≤n, 1≤k≤m; II, serially connecting and combining the segmentation networks of the $i^{th}$ layer to the $j^{th}$ layer as the $k^{th}$ sub segmentation network, wherein i and i are both the layer index, wherein k is an integer index for the sub segmentation networks, and wherein 1≤i<j≤n, 1≤k≤m; training the overall segmentation network comprises sequentially training a $1^{st}$ sub segmentation network to a $m^{th}$ sub segmentation network, wherein since it is necessary to input the original image data to the encoding blocks of the $1^{st}$ layer according to a specific path for training the sub segmentation networks, the image data with labeled segmentation is outputted by the decoding blocks of the $1^{st}$ layer finally, and therefore, the $k^{th}$ sub segmentation network needs to combine the $1^{st}$ sub segmentation network to the $k^{th}$ sub segmentation network together to train, specifically comprises following steps:

I: training the $(k-1)^{th}$ sub segmentation network;

II: fixing the parameters of the convolution kernels of the trained $(k-1)^{th}$ sub segmentation network; and III: training the $k^{th}$ sub segmentation network till training of all sub segmentation networks are completed;

wherein training the $k^{th}$ sub segmentation network specifically comprises:

with the parameters of the convolution kernels of the trained previous (k-1) sub segmentation networks being fixed, inputting the original medical image data of the training set into the encoding blocks of the sub segmentation network of the $1^{st}$ layer to complete an encoding block-decoding block path of the sub segmentation network, and finally, outputting, by the decoding blocks of the sub segmentation network of the $1^{st}$ layer, the image data with labeled segmentation, calculating a loss function value according to an output result and the corresponding known image data with labeled segmentation, and optimizing the parameters of the convolution kernels of the $k^{th}$ sub segmentation network by means of a gradient back-propagation algorithm by utilizing a calculation result; and continuously iterating the process till a related result of the loss function is optimum, and using the parameters of the convolution kernels at the time as the optimum parameters of the convolution kernels of the $k^{th}$ sub segmentation network.

* * * * *